United States Patent
Stieger et al.

(10) Patent No.: US 11,378,017 B2
(45) Date of Patent: Jul. 5, 2022

(54) SUPERSONIC AIRCRAFT TURBOFAN

(71) Applicant: ROLLS-ROYCE plc, London (GB)

(72) Inventors: Rory D Stieger, Derby (GB); Conor Hickey, Bristol (GB)

(73) Assignee: ROLLS-ROYCE plc, London (GB)

( * ) Notice: Subject to any disclaimer, the term of this patent is extended or adjusted under 35 U.S.C. 154(b) by 353 days.

(21) Appl. No.: 16/448,214

(22) Filed: Jun. 21, 2019

(65) Prior Publication Data

US 2020/0025109 A1 Jan. 23, 2020

(30) Foreign Application Priority Data

Jul. 20, 2018 (GB) .................................... 1811852

(51) Int. Cl.
*F02C 9/20* (2006.01)
*B64D 31/06* (2006.01)
(Continued)

(52) U.S. Cl.
CPC ................ *F02C 9/20* (2013.01); *B64D 31/06* (2013.01); *B64D 33/02* (2013.01); *B64D 33/04* (2013.01);
(Continued)

(58) Field of Classification Search
CPC ... F02K 1/06; F02K 1/17; F02K 1/386; F02K 1/40; F02K 1/46; F02K 1/48; F02C 9/20;
(Continued)

(56) References Cited

U.S. PATENT DOCUMENTS 3,004,385 A * 10/1961 Spears .................... F02K 1/123
239/265.41
3,214,905 A * 11/1965 Beavers ................ F02K 1/1269
239/265.17

(Continued)

FOREIGN PATENT DOCUMENTS

EP 1527997 A2 5/2005
GB 1068746 A 5/1967

(Continued)

OTHER PUBLICATIONS

Jan. 17, 2019 Search Report issued in British Patent Application No. GB1811852.1.

(Continued)

*Primary Examiner* — Jason H Duger
(74) *Attorney, Agent, or Firm* — Oliff PLC

(57) ABSTRACT

A turbofan engine has an engine core including in flow series a compressor, a combustor and a turbine. The engine further has a fan located upstream of the engine core, has a supersonic intake for slowing down incoming air to subsonic velocities at an inlet to the fan formed by the intake, has a bypass duct surrounding the engine core, wherein the fan generates a core airflow to the engine core and a bypass airflow through the bypass duct, and has a mixer for mixing an exhaust gas flow exiting the engine core and bypass airflow exiting bypass duct. The engine further has a thrust nozzle rearwards of the mixer for discharging mixed flows, the thrust nozzle having a variable area throat. The engine further has a controller controlling the thrust produced by the engine over a range of flight operations including on-the-ground subsonic take-off and subsequent off-the-ground subsonic climb.

11 Claims, 4 Drawing Sheets

(51) Int. Cl.
*B64D 33/02* (2006.01)
*B64D 33/04* (2006.01)
*F02C 9/54* (2006.01)
*F02K 3/06* (2006.01)

(52) U.S. Cl.
CPC .......... *F02C 9/54* (2013.01); *F02K 3/06* (2013.01); *B64D 2033/0286* (2013.01); *F05D 2220/323* (2013.01); *F05D 2220/80* (2013.01); *F05D 2260/96* (2013.01); *F05D 2270/051* (2013.01); *F05D 2270/095* (2013.01); *F05D 2270/71* (2013.01)

(58) Field of Classification Search
CPC .......... F02C 9/48; F02C 9/54; F05D 2220/80; B64D 31/06; B64D 33/02; B64D 33/04; B64D 2033/0286
See application file for complete search history.

(56) References Cited

U.S. PATENT DOCUMENTS

| | | |
|---|---|---|
| 2005/0081509 A1 | 4/2005 | Johnson |
| 2005/0211822 A1 | 9/2005 | Franchet et al. |
| 2015/0121889 A1* | 5/2015 | Baker ............... F02K 1/15 60/772 |
| 2016/0265445 A1* | 9/2016 | Fiedler ............... F02C 9/46 |
| 2017/0276092 A1 | 9/2017 | Caruel |
| 2018/0094605 A1* | 4/2018 | Rosenau ............... F02K 1/60 |
| 2018/0229851 A1* | 8/2018 | Joshi ............... B64D 31/06 |

FOREIGN PATENT DOCUMENTS

| | | |
|---|---|---|
| WO | 03/036063 A2 | 5/2003 |
| WO | 2007/093760 A1 | 8/2007 |

OTHER PUBLICATIONS

Dec. 6, 2019 extended European Search Report issued in European Patent Application No. 19181409.4.

* cited by examiner

SUPERSONIC AIRCRAFT TURBOFAN

CROSS-REFERENCE TO RELATED APPLICATIONS

This specification is based upon and claims the benefit of priority from United Kingdom patent application number GB 1811852.1 filed on Jul. 20, 2018, the entire contents of which are incorporated herein by reference.

BACKGROUND

Field of the Disclosure

The present disclosure relates to a turbofan for a supersonic aircraft.

Description of the Related Art

There is a growing interest in the development of supersonic aircrafts for civil use. In particular, gas turbine engine systems that effectively provide thrust in subsonic, transonic and supersonic flight regimes, with reduced noise output during certain operations, are of interest.

Such engines have special adaptations relative to more conventional engines used purely for subsonic flight. For example, gas turbine engines are not designed to operate with an airflow velocity that is greater than Ma 1.0 (Ma=Mach number) for the airflow entering the engine compression section. Therefore, for supersonic flight, the inlet to the gas turbine engine must be specially shaped to slow the velocity of the airflow down to a predetermined level below Ma=1.0. More generally, the engine intake has to accelerate or decelerate the incoming air such that the non-dimensional air flow rate at the fan inlet matches that demanded by the engine cycle. For supersonic aircraft the intake must operate over a particularly wide range of inlet conditions and fan flow rates. One approach for achieving high intake performance over a range of conditions is to provide a variable geometry intake so that the Intake throat area matches the flow required by the engine. However, a variable geometry intake requires a complex intake actuation system which adds weight and engine architecture complexity.

As to noise reduction and engine efficiency, these can both be improved compared to a pure turbojet by adopting a low or medium bypass ratio turbofan configuration. In particular, this can provide sufficiently high exhaust jet velocities for supersonic flight, while improving engine efficiency and significantly reducing noise generated by the exhaust jet.

A further consideration for supersonic aircraft is that they require high levels of take-off thrust to achieve reasonably short take-off distances. This is because supersonic aircraft have a low wing area and a correspondingly low maximum lift, and thus need high take off speeds.

However, the fan diameter should be sized such that the take-off thrust is delivered with an exhaust jet velocity which is also low enough (about 300 m/s (1000 ft/s)) to adequately limit noise generated by the jet at side-line. On the other hand, increasing the fan diameter substantially increases the drag experienced by the aircraft at supersonic cruise, and hence increases fuel consumption and reduces range.

It would be desirable to provide a propulsion system for a supersonic aircraft which can address these competing considerations.

SUMMARY OF THE DISCLOSURE

In a first aspect, the present disclosure provides a turbofan engine for providing propulsive thrust to a supersonic aircraft, the engine having:
an engine core comprising in flow series a compressor, a combustor and a turbine;
a fan located upstream of the engine core;
a supersonic intake for slowing down incoming air to subsonic velocities at an inlet to the fan formed by the intake;
a bypass duct surrounding the engine core, wherein the fan generates a core airflow to the engine core and a bypass airflow through the bypass duct;
a mixer for mixing an exhaust gas flow exiting the engine core and the bypass airflow exiting the bypass duct;
a thrust nozzle rearwards of the mixer for discharging the mixed flows, the thrust nozzle having a variable area throat; and
a controller configured to control the thrust produced by the engine over a range of flight operations including on-the-ground subsonic take-off and subsequent off-the-ground subsonic climb;
wherein, to achieve a high level of engine thrust during the take-off operation, the controller performs or is configured to perform the take-off operation with a reduced area of the variable area throat, and to achieve a reduced jet noise after take-off, during the climb operation the controller increases or is configured to increase the area of the variable area throat.

The decreased area of the throat at take-off increases the pressure ratio of the fan and enables a high jet velocity and hence high thrust. Although subsequently increasing the area of the variable area throat has an effect of reducing the level of thrust, it can still be maintained above what is needed for climb while benefiting from a reduced jet noise compared to the on-the-ground jet noise. Importantly, this reduced jet noise can help the aircraft comply with over-flight noise regulations.

In a second aspect, the present disclosure provides a supersonic aircraft having the turbofan engine according to the first aspect.

In a third aspect, the present disclosure provides a method of operating a supersonic aircraft having a turbofan engine which provides propulsive thrust to the aircraft over a range of flight operations including on-the-ground subsonic take-off and subsequent off-the-ground subsonic climb, the engine having:
an engine core comprising in flow series a compressor, a combustor and a turbine;
a fan located upstream of the engine core;
a supersonic intake for slowing down incoming air to subsonic velocities at an inlet to the fan formed by the intake;
a bypass duct surrounding the engine core, wherein the fan generates a core airflow to the engine core and a bypass airflow through the bypass duct;
a mixer for mixing an exhaust gas flow exiting the engine core and the bypass airflow exiting the bypass duct; and
a thrust nozzle rearwards of the mixer for discharging the mixed flows, the thrust nozzle having a variable area throat;
the method including:
performing a take-off operation with the aircraft, the engine providing propulsive thrust at a high level during the take-off operation by implementing a reduced area of the variable area throat; and transitioning the aircraft after the take-off operation to a subsequent climb operation in which the area of the variable area throat is increased.

Thus the method of the third aspect corresponds to the engine of the first aspect.

Optional features of the present disclosure will now be set out. These are applicable singly or in any combination with any aspect of the present disclosure.

Conveniently, the controller is an engine electronic controller (EEC) for the engine.

The controller may increase or may be configured to increase the area of the variable area throat at a first predetermined point during the climb operation. For example, the first predetermined point may be any one of a predetermined aircraft speed (e.g. a speed above a critical take off speed), a predetermined fan speed, a predetermined aircraft altitude, a predetermined aircraft flap position, aircraft landing gear retraction, and a predetermined time (e.g. after take-off or after any of the preceding events).

The controller may increase or may be configured to increase the area of the variable area throat by from 10% to 70% of its area immediately before the increase.

The intake may have a fixed geometry, i.e. such that it is not variable to control the thrust produced by the engine over the range of flight operations. As indicated above, this can help to avoid additional weight and engine architecture complexity associated with the intake.

The variable area throat of the thrust nozzle may be configured such that the change in area between its maximum area and its minimum area is at least 10% of the minimum area, and preferably is at least 15% or 20% of the minimum area.

The engine may further have one or more components which are adjustable to vary the relative areas available for the hot exhaust gas flow and the cold bypass airflow at the mixer. During the climb operation the controller can then also alter these relative areas to increase the area for the hot exhaust gas flow relative to the area for the cold bypass airflow. As a result, a more equal ratio of hot flow to cold flow velocities can be achieved, so that the noise generated by the jet is further reduced. The controller may increase the area for the hot exhaust gas flow relative to the area for the cold bypass airflow at the mixer such that the value of $(AHOT_{after}/ACOLD_{after})/(AHOT_{before}/ACOLD_{before})$ is in the range from 1.1 to 2.5, where AHOT is the area for the hot exhaust gas flow at the mixer, ACOLD is the area for the cold bypass airflow at the mixer, and the subscripts "before" and "after" denote respectively immediately before and immediately after the relative increase in area. The component(s) may be configured such that the change in relative area between the maximum relative area available at the mixer for the hot exhaust gas flow and the minimum relative area available at the mixer for the hot exhaust gas flow is at least 20% of the maximum relative area, and preferably is at least 30%, 40% or 50% of the maximum relative area. To vary the relative areas available for the hot exhaust gas flow and the cold bypass airflow at the mixer, the mixer may be a variable area mixer. Additionally or alternatively, the engine may have an adjustable outlet cone behind the turbine to vary the area available for the exhaust gas flow exiting the engine core at the mixer.

During the take-off operation or the climb operation the controller may reduce or may be configured to reduce fuel flow to the combustor. In particular, the controller may reduce or may be configured to reduce fuel flow to the combustor at a second predetermined point during the take-off operation or the climb operation. The predetermined point may be any one of a predetermined aircraft speed, a predetermined weight-on-wheels (e.g. zero weight-on-wheels), a predetermined distance along runway, a predetermined aircraft speed, a predetermined fan speed, a predetermined aircraft altitude, a predetermined aircraft flap position, aircraft landing gear retraction, and a predetermined time (e.g. after take-off or after any of the preceding events). If the fuel flow reduction is performed during the climb operation, then preferably it is performed before the reduction in throat area. This helps to better tailor the engine thrust response while retaining engine operability, the engine response to fuel flow reduction being inertia dominated and thus generally slower than the engine response to the reduction in throat area. However, this does not exclude that reduction in throat area can be performed before fuel flow reduction, or that both can be performed at the same time.

In the event of an engine failure or malfunction it is more important that the aircraft continues to manoeuvre safely than that noise constraints are adhered to. Accordingly, the controller may be further configured, in the event of an engine failure or malfunction after the reduction of the area of the variable area throat, to increase the area of the variable area throat to revert to a high level of engine thrust. Similarly, the controller may be further configured, in the event of an engine failure or malfunction after the reduction fuel flow to the combustor, to increase the fuel flow to the combustor to revert to a high level of engine thrust. Similarly, the controller may be further configured, in the event of an engine failure or malfunction after the increase in the area for the hot exhaust gas flow relative to the area for the cold bypass airflow at the mixer, to decrease the area for the hot exhaust gas flow relative to the area for the cold bypass airflow at the mixer. The controller may be further configured, in the event of an engine failure or malfunction before the reduction of the area of the variable area throat or before the reduction fuel flow to the combustor to prevent the respective reduction.

BRIEF DESCRIPTION OF THE DRAWINGS

Embodiments of the present disclosure will now be described by way of example with reference to the accompanying drawings in which.

DETAILED DESCRIPTION OF THE DISCLOSURE

1. Engine

Figure 1:
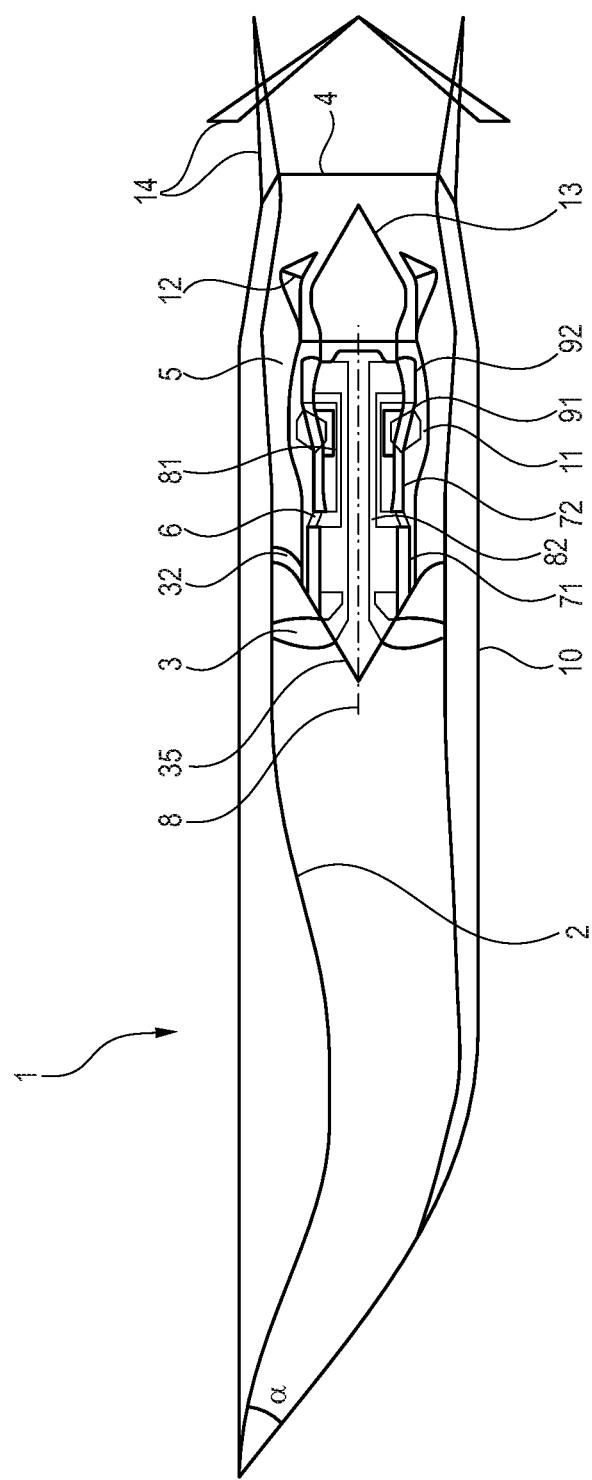
FIG. 1 shows a longitudinal cross-section through a ducted fan gas turbine main engine for supersonic flight operation of an aircraft.

FIG. 1 shows a longitudinal cross-section through a turbofan engine 1 for a civil supersonic aircraft. The turbofan engine 1 comprises an engine intake 2, a single stage fan 3 (although in other embodiments a multi-stage fan can be used), a primary flow channel 6 that leads through a engine core, a secondary flow channel 5 that leads past the engine core, a multi-lobed mixer 12, and a thrust nozzle 4 into which a thrust reverser 14 (shown in both stowed and deployed configurations) can be integrated.

The turbofan engine 1 has a machine axis or engine centre line 8. The machine axis 8 defines an axial direction of the turbofan engine. A radial direction of the turbofan engine extends perpendicularly to the axial direction.

The engine core comprises in a per se known manner a compressor 71, 72, a combustion chamber 11 and a turbine 91, 92. In the shown exemplary embodiment, the compressor comprises a booster compressor 71 and a high-pressure compressor 72. The turbine that is arranged behind the combustion chamber 11 comprises a high-pressure turbine 91 and a low-pressure turbine 92. The high-pressure turbine 91 drives a high-pressure shaft 81 that connects the high-pressure turbine 91 to the high-pressure compressor 7. The low-pressure turbine 92 drives a low-pressure shaft 82 that connects the low-pressure turbine 92 to the booster compressor 71 and the single stage fan 3.

The turbofan engine 1 is arranged inside an engine nacelle 10. It is connected to the aircraft fuselage, for example via a pylon.

The engine intake 2 forms a supersonic air inlet and is correspondingly provided and suitable for slowing down the inflowing air to velocities of below Ma 1.0. In FIG. 1, but not necessarily, the engine intake is bevelled, forming an angle α, wherein the upper edge projects with respect to the lower edge. This serves for a better distribution of compression shocks as they occur in supersonic flight. However, in principle the engine intake can be formed in a straight manner, i.e. with an angle α of 90°, or a different angle than the one shown.

Upstream, the fan 3 is provided with a nose cone 35. Behind the fan 3, the flow channel through the fan 3 is divided into the primary flow channel 6 and the secondary flow channel 5. The secondary flow channel 5 is also referred to as the bypass flow channel or the bypass channel. A fan stator 32 comprising a plurality of stator blades is located in the secondary flow channel 5 behind the fan 3.

Behind the engine core, the primary flow from the primary flow channel 6 and the secondary flow from the secondary flow channel 5 are mixed by the mixer 12. Further, an outlet cone 13 is inserted behind the turbine to realize the desired cross section of the primary flow channel.

The thrust nozzle 4 has a variable area throat, e.g. as described in US 2004/0006969 A1 and U.S. Pat. No. 8,453,458. Further, the mixer 12 can be a variable area mixer which allows the relative areas available for the primary flow and the bypass flow at the mixer to be adjusted, and/or the outlet cone 13 can be adjustable to vary the area available for the relative areas available for the hot exhaust gas flow and the cold bypass airflow flow exiting the engine core at the mixer, e.g. as also described in US 2004/0006969 A1 and U.S. Pat. No. 8,453,458.

Other gas turbine engines to which the present disclosure may be applied may have alternative configurations. By way of example such engines may have a different number of interconnecting shafts (e.g. one or three) and/or a different number of compressors and/or turbines. Further the engine may comprise a gearbox provided in the drive train from a turbine to a compressor and/or fan.

2. General Control Principles

The engine has an EEC (not shown) which controls many aspects of the engine's performance. In particular, the EEC controls the engine cycle to decouple take-off thrust requirements on the ground with the following early stages of flight (i.e. initial climb).

Specifically, a high exhaust jet velocity is produced to achieve the required take-off speed in a sensible take-off field length. The EEC obtains the elevated thrust in this phase of the mission (recognised by the EEC, for example, by an aircraft speed below take-off speed combined with aircraft on ground indicated by, for example, weight on the wheels) by reducing the thrust nozzle throat area while supplying a high fuel flow to the combustor (although remaining within the ultimate temperature limits of the engine). Reducing the thrust nozzle throat area while increasing fan speed so as to maintain or increase mass flow, increases the pressure ratio of the fan and thus increases the exhaust jet velocity.

Upon leaving the ground (as indicated, for example, by no weight on wheels and/or aircraft speed in excess of critical take off velocity), the EEC reduces the jet velocity and hence the thrust to a level below that on the ground but adequate to achieve a minimum climb gradient as set by aircraft certification requirements (these are typically defined on the one engine inoperative (OEI) case and the number of engines). The reduction in exhaust jet velocity is achieved by increasing the thrust nozzle throat area. This reduces the fan pressure ratio and reduces the exhaust jet velocity.

Optionally, at a pre-defined marker (which can be air speed, or zero weight on wheels) the EEC initiates a reduction in fuel flow to the combustor. This also decreases the thrust and thus reduces the acceleration of the aircraft, but not to the point where the aircraft no longer accelerates. The thrust response of the engine to changes in fuel flow/throttle position may be different to the thrust response to changes in nozzle throat area. Accordingly, it may be preferable to initiate the fuel flow change at a different time to the nozzle throat area change, to improve engine operability.

A further option is for the EEC to actuate a variable area mixer 12 and/or an adjustable outlet cone 13 to alter the relative areas available for the hot exhaust gas flow and the cold bypass airflow flow exiting the engine core at the mixer in order to achieve a more equal ratio of hot flow to cold flow velocities so that the noise generate by the exhaust is reduced. In particular increasing the area for the hot flow relative to that for the cold flow tends to equalise the velocities.

By implementing the above adjustments via the thrust schedule of the EEC, no pilot intervention is required. The EEC can also implement a failure protocol in which it reverts to maximum thrust by increasing fuel flow to the combustor and reducing the thrust nozzle throat area.

3. Detailed Analysis

Take-off thrust $F_{TO}$ is set by the relationship between aircraft weight (MTOW), lift coefficient ($C_L$) air density ($\rho$) wing area ($S_{ref}$), rolling resistance coefficient ($\mu_r$), and lift to drag ratio (L/D) and available take off distance ($x_{lo}$).

$$F_{TO} = \frac{1}{2} \cdot g \cdot MTOW \cdot \left( \frac{2 \cdot MTOW}{C_L \cdot \rho \cdot S_{ref} \cdot x_{lo}} + MTOW \left( \frac{1}{2 \cdot L/D} + \frac{3 \cdot \mu_r}{2} \right) \right)$$

For an aircraft of wing area $S_{ref}$=200 m², MTOW=80000 kg, L/D=8.5, $C_L$=0.5 and assuming a rolling resistance $\mu_r$=0.02, then to achieve a 8000 ft (2400 m) take-off field length requires a take-off thrust of $F_{TO} \approx 21$ klbf (93 kN)

A fan sized to achieve this thrust with a fan face Mach number of M=0.65 and a hub-to-tip ratio of HTR=0.3 while retaining an exhaust jet velocity below ~1100 ft/s (335 m/s) in order to achieve an acceptable noise would have a diameter of 65 inches (1650 mm).

The thrust requirement in a second segment of climb (in accordance with climb requirements set out in Title 14, Chapter I, Subchapter C, § 25.111 of the Aeronautics and Space, Airworthiness Standards: Transport Category Airplanes, Federal Aviation Administration, US Department of Transportation as of 16 Jul. 2018—see https://www.ecfr.gov/cgi-bin/text-idx?node=14:1.0.1.3.11#se14.1.25_1111) is set by a need to meet a prescribed climb gradient in OEI failure cases. The thrust required may be expressed in terms of the gravitational constant (g) aircraft weight (MTOW), climb gradient ($Y_{OEI}$), lift to drag in one engine inoperative condition ($L/D_{OEI}$) and the number of engines ($N_{eng}$).

$$F_{2ndSeg} = F_{OEI} = \frac{g \cdot MTOW \cdot \left( \gamma_{OEI} \cdot \frac{L}{D_{OEI}} + 1 \right)}{\frac{L}{D_{OEI}} (N_{eng} - 1)}$$

Assuming a reduction in L/D for OEI conditions to $L/D_{OEI}$=7.5 and a three engine configuration, the thrust requirement to retain level flight ($Y_{OEI}$=0) in OEI conditions reduces to $F_{2ndSeg}$~11.7 klbf (52 kN). A fan sized by the same principles as above to this lower thrust requirement would have a diameter of only about 49 inches (1240 mm).

In order to reduce noise over a flyover microphone it is permissible to reduce the engine thrust to a lower level retaining a minimum climb gradient with all engines operative. The thrust level is set by:

$$F_{Final} = \frac{g \cdot MTOW \cdot \left( \gamma_{Fin} \cdot \frac{L}{D} + 1 \right)}{\frac{L}{D} N_{eng}}$$

In this phase of flight, while retaining $\gamma_{Fin}$=1.5%, the thrust requirement reduces further to $F_{Final}$~7.8 klbf (35 kN).

Changes to engine thrust are conventionally achieved by changes to the fuel flow to the combustor. However, changing the geometry of the engine also allows changes to the engine operating point to be achieved. The gas flow through an engine is primarily controlled by the area at the inlet to the turbine, and in the case of a turbofan engine also by the throat area of the final thrust nozzle. Variation of the turbine inlet area is mechanically challenging to achieve. However, by reducing the throat area of the final thrust nozzle while increasing the fan speed to retain the same mass flow, the pressure rise through the fan may be increased together with the jet velocity and therefore thrust. Higher pressure ratios at a fixed flow move the fan operating point closer to the stability limit of the fan. But by reducing the area for the hot exhaust gas flow (which generally also entails increasing the area for the cold bypass airflow) at the mixer the operating point of the fan may be moved away from the stability limit.

Figure 2A:
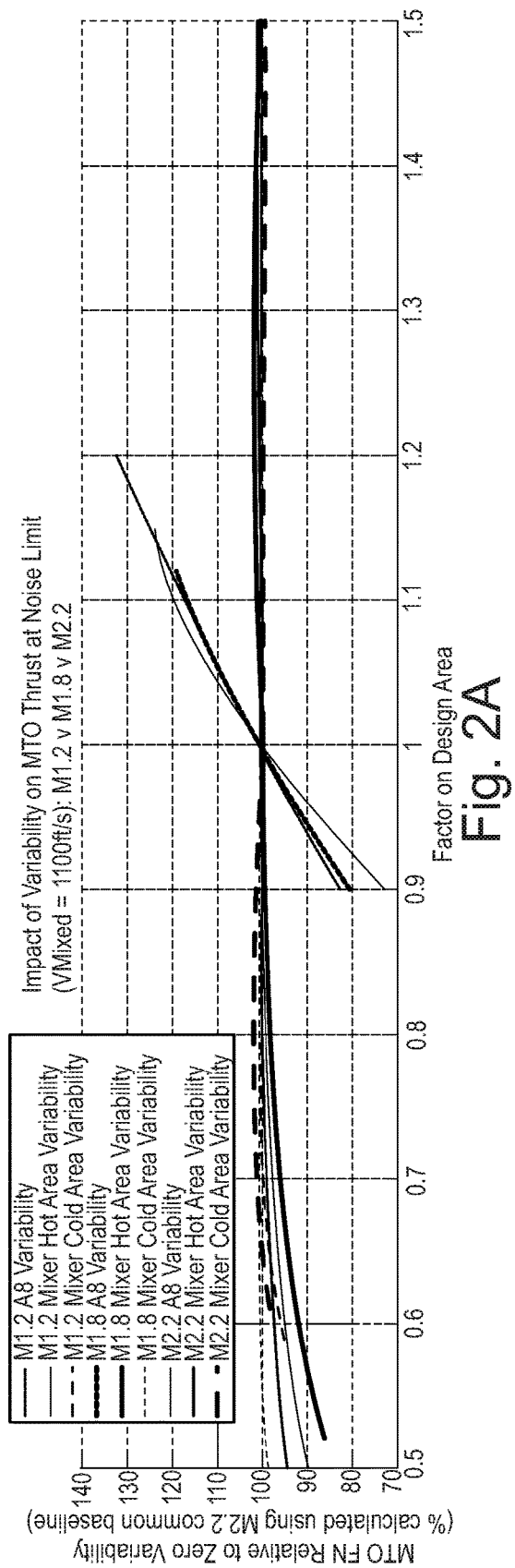
FIG. 2A shows, for three aircraft flight speed design Mach numbers of M1.2, M1.8 and M2.2, plots of maximum take-off (MTO) thrust against area variabilities for thrust nozzle throat area (A8), the hot stream mixer area (Hot Area) and cold stream mixer area (Cold Area) relative to a fixed geometry engine at an exhaust jet velocity at a noise limit of 1100 ft/s (335 m/s) and a fixed turbine inlet temperature.
Figure 2B:
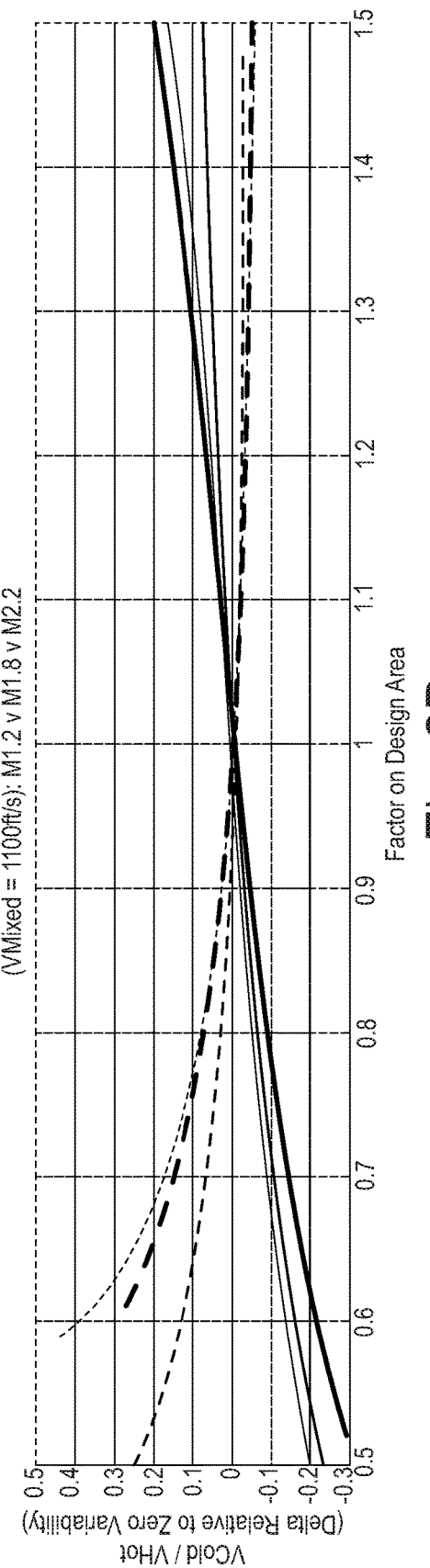
FIG. 2B shows corresponding plots of the change in the ratio of cold stream velocity to hot stream velocity against area variabilities for the hot stream mixer area and the cold stream mixer area.
Figure 3:
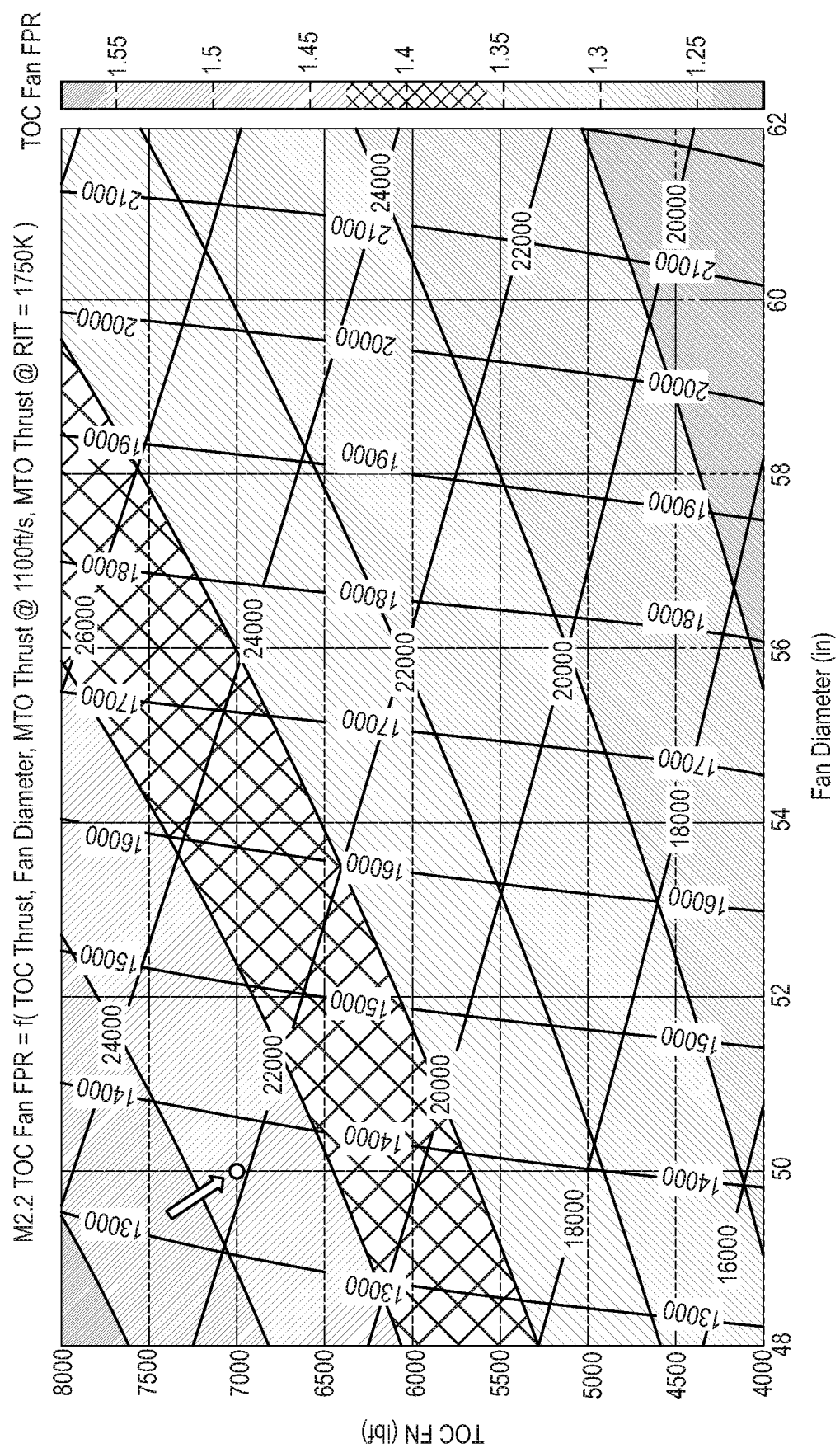
FIG. 3 shows a contour plot illustrating a relationship between fan diameter, top of climb (TOC) thrust and fan pressure ratio (FPR), the plot being overlaid with contour lines (running downhill from left to right) representing achievable take-off thrust when the engine is run in a maximum thrust configuration, and with further contour lines (running much more steeply downhill from right to left) depicting achievable take-off thrust in a maximum allowed noise configuration.

FIG. 2A shows, for three aircraft flight speed design Mach numbers of M1.2, M1.8 and M2.2, plots of maximum take-off (MTO) thrust against area variabilities for the thrust nozzle throat area (A8), the hot stream mixer area (Hot Area) and the cold stream mixer area (Cold Area) relative to a fixed geometry engine at an exhaust jet velocity at the noise limit of 1100 ft/s (335 m/s) and a fixed turbine inlet temperature. FIG. 2B shows corresponding plots of the change in the ratio of cold stream velocity to hot stream velocity against area variabilities for the hot stream mixer area and the cold stream mixer area (variation of A8 had no significant impact on this ratio). The fixed jet velocity constraint prevents an increase in fan pressure ratio and as a result increasing A8 results in a significant increase in thrust relative to the datum nozzle area as more mass flow passes through the fan. For the M2.2 engine more than 120% of the zero variability MTO thrust is achieved with a thrust nozzle throat area of 115% of the nominal value (the area designed for maximum engine air-flow flight condition such as at top of climb). Additionally varying the mixer hot and cold areas changes the relative velocities from the hot and cold streams allowing equalisation of these velocities to reduce the noise generated. Increasing the hot mixer area tends to equalise the stream velocities. Decreasing the cold mixer area also tends to equalise the stream velocities. FIG. 3 then shows a contour plot illustrating the relationship between fan diameter, top of climb (TOC) thrust and fan pressure ratio (FPR). Overlaid are contour lines (running downhill from left to right) representing the achievable take-off thrust when the engine is run in a maximum thrust configuration to a limiting turbine inlet temperature T41=T41max with the thrust nozzle throat area A8 at 107.5% of the design area and the hot mixer area AHOT at 100% of the design area. For these relationships, T41max is the same as the maximum rotor inlet temperature (RIT) and is taken as 1750 K. The design area is set by the maximum engine air-flow condition which occurs at top of climb conditions. Further contour lines (running much more steeply downhill from right to left) depict achievable take-off thrust in a maximum allowed noise configuration in which there is a noise limit constraint on exhaust jet velocity of 1100 ft/s (335 m/s). In this configuration A8 is 115% of the design value and AHOT is 130% of the design area. It is apparent that an engine of 50 inch (1270 mm) diameter delivering a top of climb thrust of 7000 lbf (31 kN) (indicated on FIG. 3 by the arrowed circle) is capable of achieving about 13750 lbf (161 kN) of thrust in the maximum allowed noise configuration or about 22500 lbf (100 kN) of thrust in the maximum thrust configuration.

Figure 4A:
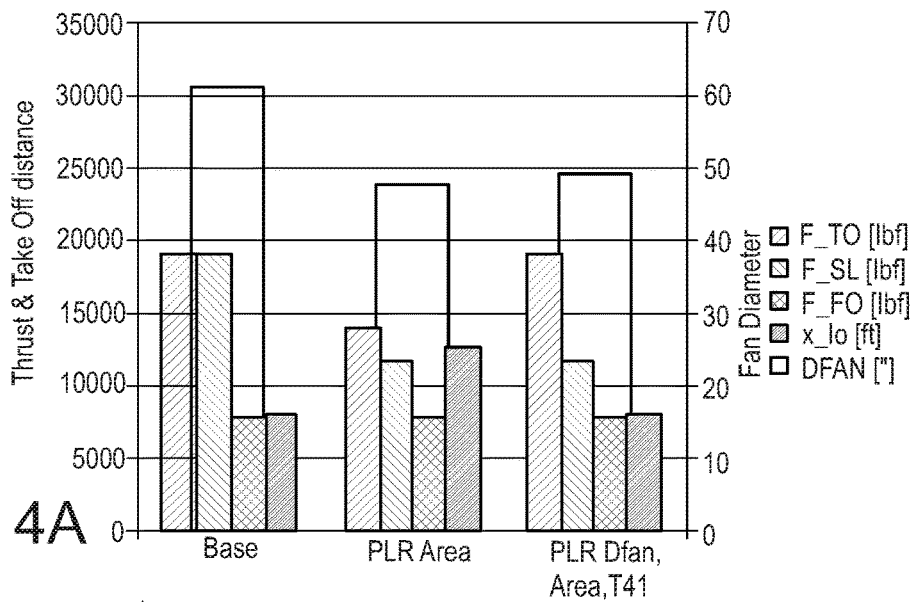
FIG. 4A shows thrusts at take-off (F_TO), sideline (F_SL) and fly-over (F_FO) noise points together with the take-off field length (x_lo) and fan diameter (DFAN) of a baseline engine (BASE), a first engine variant (PLR Area) and a second engine variant (PLR Dfan, Area, T41)
Figure 4B:
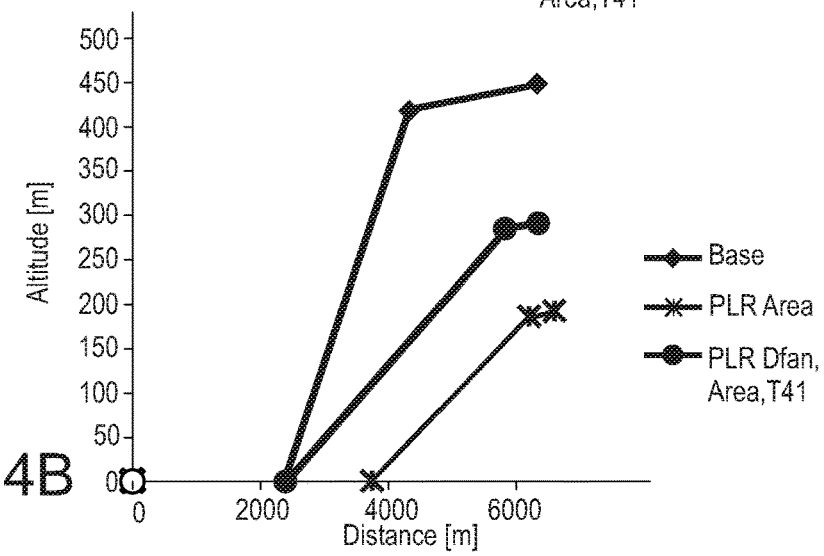
FIG. 4B shows achievable flight trajectories for the three engines.
Figure 4C:
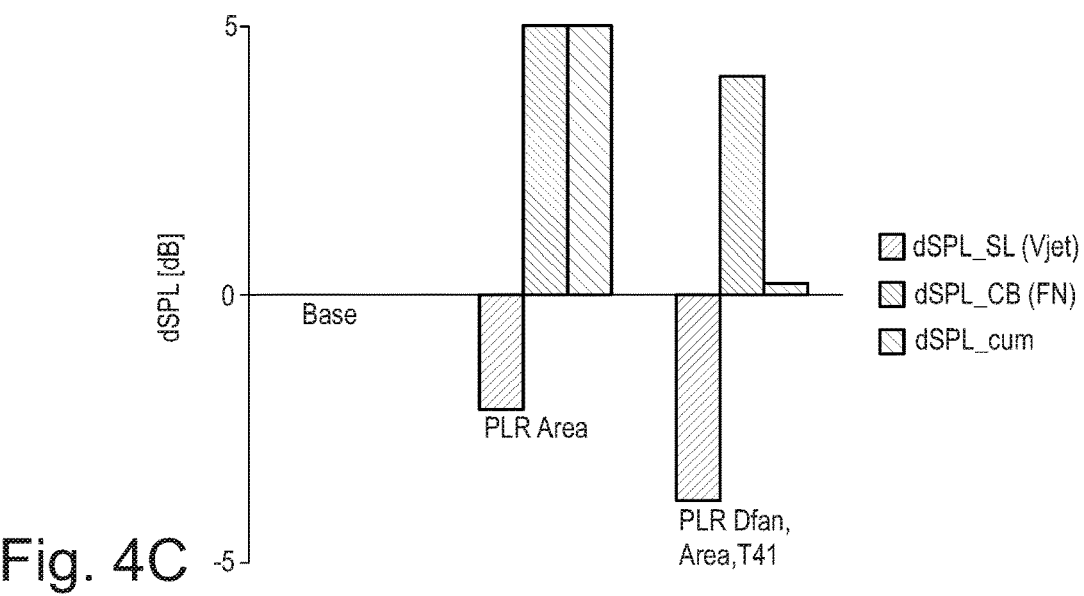
FIG. 4C shows estimations of the relative certification noise produced by the three engines, dSPL_SL (Vjet) being sideline noise, dSPL_CB (FN) being flyover noise and dSPL_cum being cumulative noise.

The thrust augmentation achievable on the ground relative to in-flight may be used to reduce the fan diameter at an approximately equal noise level for certification. FIG. 4A shows thrusts at take-off (F_TO), sideline (F_SL) and flyover (F_FO) noise points together with the take-off field length (x_lo) and the fan diameter (DFAN) of a baseline (BASE) and two further engine variants. The first (PLR Area) uses only area variation of the thrust nozzle throat to achieve a 120% thrust augmentation. The second (PLR Dfan, Area, T41) employs throttle increase and thrust nozzle throat area variation to provide a 165% increase in thrust on the ground. FIG. 4B then shows achievable flight trajectories for the three engines, and FIG. 4C shows estimations of the relative certification noise produced by engines, dSPL_SL (Vjet) being sideline noise, dSPL_CB (FN) being flyover noise and dSPL_cum being cumulative noise. The area variation alone (PLR Area) delivers an engine of reduced diameter but by the certification noise measure lacks sufficient thrust to achieve sufficient height over the noise measuring positions, thereby resulting in an overall increase in certification noise. The variant including area variation and increased fuel flow achieves a cumulative noise margin equivalent to that the baseline, by trading sideline and flyover noise levels, but has a significantly reduced fan diameter allowing significant increase in aircraft range.

Taking a nominal value for the thrust nozzle throat area as 1.0, then the reduced throat area at take-off typically has a value of about 0.9 for all types of aircraft (i.e. design Mach numbers), while the increased area of the variable area throat during subsequent climb varies between aircraft types, e.g. from about 1.12 to about 1.2. Thus, across aircraft types, based on these values the increase in the variable area throat typically lies in a range of from 10% to 70% of its area (i.e. 0.9) immediately before the increase.

Similarly, it is possible to determine a typical range for the ratio $(AHOT_{after}/ACOLD_{after})/(AHOT_{before}/ACOLD_{before})$, where AHOT is the area for the hot exhaust gas flow at the mixer, ACOLD is the area for the cold bypass airflow at the mixer, and the subscripts "before" and "after" denote respectively immediately before and immediately after a relative increase in the area for the hot exhaust gas flow relative to the area for the cold bypass airflow. In particular, if $AHOT_{before}$ and $ACOLD_{before}$ have nominal values of 1.0, then:

If just $AHOT_{after}$ is varied, a maximum value for $AHOT_{after}$ is about 1.5, such that the ratio=1.5, and a minimum value for $AHOT_{after}$ is about 1.1, such that the ratio=1.1; and If just $ACOLD_{after}$ is varied, a minimum value for $ACOLD_{after}$ is about 0.6, such that the ratio=1.66, and a maximum value for $ACOLD_{after}$ is about 0.9, such that the ratio=1.11

An extreme variation of a maximum value for $AHOT_{after}$ and a minimum value for $ACOLD_{after}$ thus gives a ratio of 1.5/0.6=2.5. Thus based on these values the ratio typically lies in a range of from 1.1 to 2.5, with a typical desired target ratio of 1.25/0.88=1.42 being based on $AHOT_{after}=1.25$ and $ACOLD_{after}=0.88$.

4. Summary

By varying the thrust nozzle throat area after take-off and during the climb it is possible to achieve:

A high take-off speed with high thrust within a reasonable field length

A lower fan diameter while meeting noise constraints as a result of reduced thrust after take-off, the lower fan diameter providing a significant reduction in engine cross-sectional area and hence a significant reduction in wave drag on the aircraft and an increased in range While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Moreover, in determining extent of protection, due account shall be taken of any element which is equivalent to an element specified in the claims. Various changes to the described embodiments may be made without departing from the spirit and scope of the invention.

We claim:

1. A turbofan engine for providing propulsive thrust to a supersonic aircraft, the turbofan engine comprising:

an engine core including, in flow series, a compressor, a combustor, and a turbine;

a fan located upstream of the engine core;

a supersonic intake configured to decrease air velocities of incoming air to subsonic velocities at an inlet to the fan formed by the intake;

a bypass duct surrounding the engine core, the fan being configured to generate a core airflow to the engine core and to generate a cold bypass airflow through the bypass duct;

a variable mixer configured to mix a hot exhaust gas flow exiting the engine core with the cold bypass airflow exiting the bypass duct, the mixer being configured to vary a cross-sectional area of a hot inlet of the mixer for the hot exhaust gas flow and a cross-sectional area of a cold inlet of the mixer for the cold bypass airflow to change a ratio of an amount of the hot exhaust gas flow relative to an amount of the cold bypass airflow that is mixed by the mixer;

a thrust nozzle located rearwards of the mixer, the thrust nozzle being configured to discharge the exhaust gas flow and the bypass airflow mixed by the mixer, the thrust nozzle having a variable area throat defining a cross-sectional throat area, the thrust nozzle being configured to controllably vary the throat area; and a controller configured to:

perform a ground subsonic take-off operation by controlling the thrust nozzle to reduce the throat area of the variable area throat, which increases the thrust of the turbofan engine, and perform an off-the-ground subsonic climb operation by controlling the thrust nozzle to increase the throat area of the variable area throat.throat, and controlling the mixer to increase the cross-sectional area of the hot inlet and decrease the cross-sectional area of the cold inlet, which increase the amount of hot exhaust gas flow in the ratio of the hot exhaust gas flow relative to the cold bypass airflow, such that a value of $(AHOT_{after}/ACOLD_{after})/(AHOT_{before}/ACOLD_{before})$ is in a range from 1.1 to 2.5, wherein AHOT is the cross-sectional area of the hot inlet of the mixer, ACOLD is the cross-sectional area of the cold inlet of the mixer, and subscripts "before" and "after" denote respectively immediately before and immediately after the relative increase in cross-sectional area of the hot inlet.

2. The turbofan engine according to claim 1, wherein the intake has a fixed geometry.

3. The turbofan engine according to claim 1, wherein the controller is configured to perform the increase of the cross-sectional throat area of the variable area throat at a first predetermined point during the climb operation.

4. The turbofan engine according to claim 3, wherein the first predetermined point is any one of a predetermined aircraft speed, a predetermined fan speed, a predetermined aircraft altitude, a predetermined aircraft flap position, aircraft landing gear retraction, and a predetermined time.

5. The turbofan engine according to claim 1, wherein the controller is configured to perform the increase of the cross-sectional throat area of the variable area throat by from 10% to 70% of the cross-sectional throat area immediately before performing the increase.

6. The turbofan engine according to claim 1, wherein during the take-off operation or the climb operation, the controller is configured to reduce fuel flow to the combustor.

7. The turbofan engine according to claim 6, wherein the controller is configured to perform the reduction of the fuel flow to the combustor at a second predetermined point during the take-off operation or the climb operation.

8. The turbofan engine according to claim 7, wherein the second predetermined point is any one of a predetermined aircraft speed, a predetermined weight-on-wheels, a predetermined distance along runway, a predetermined aircraft speed, a predetermined fan speed, a predetermined aircraft altitude, a predetermined aircraft flap position, aircraft landing gear retraction, and a predetermined time.

9. The turbofan engine according to claim 1, wherein the controller is further configured, in the event of an engine failure or malfunction after the reduction of the cross-sectional throat area of the variable area throat, to increase the cross-sectional throat area of the variable area throat.

10. A supersonic aircraft having the turbofan engine according to claim 1.

11. A method of operating a supersonic aircraft having a turbofan engine which provides propulsive thrust to the supersonic aircraft over a range of flight operations including a transonic push operation during which the supersonic aircraft transitions from subsonic flight to supersonic flight, and a supersonic cruise operation, which has a relatively lower thrust than the transonic push operation, the turbofan engine including:
  an engine core including, in flow series, a compressor, a combustor, and a turbine;
  a fan located upstream of the engine core;
  a supersonic intake configured to decrease air velocities of incoming air to subsonic velocities at an inlet to the fan formed by the intake;
  a bypass duct surrounding the engine core, the fan being configured to generate a core airflow to the engine core and to generate a cold bypass airflow through the bypass duct;
  a variable mixer configured to mix a hot exhaust gas flow exiting the engine core with the cold bypass airflow exiting the bypass duct, the mixer being configured to vary a cross-sectional area of a hot inlet of the mixer for the hot exhaust gas flow and a cross-sectional area of a cold inlet of the mixer for the cold bypass airflow to change a ratio of an amount of the hot exhaust gas flow relative to an amount of the cold bypass airflow that is mixed by the mixer; and
  a thrust nozzle located rearwards of the mixer, the thrust nozzle being configured to discharge the exhaust gas flow and the bypass airflow mixed by the mixer, the thrust nozzle having a variable area throat defining a cross-sectional throat area, the thrust nozzle being configured to controllably vary the throat area,
the method comprising:
  performing a ground subsonic take-off operation by controlling the thrust nozzle to reduce the throat area of the variable area throat, which increases the thrust of the turbofan engine; and
  transitioning the supersonic aircraft after the take-off operation to perform an off-the-ground subsonic climb operation by controlling the thrust nozzle to increase the throat area of the variable area throat, and controlling the mixer to increase the cross-sectional area of the hot inlet and decrease the cross-sectional area of the cold inlet, which increase the amount of hot exhaust gas flow in the ratio of the hot exhaust gas flow relative to the cold bypass airflow, such that a value of $(\text{AHOT}_{after}/\text{ACOLD}_{after})/(\text{AHOT}_{before}/\text{ACOLD}_{before})$ is in a range from 1.1 to 2.5, wherein AHOT is the cross-sectional area of the hot inlet of the mixer, ACOLD is the cross-sectional area of the cold inlet of the mixer, and subscripts "before" and "after" denote respectively immediately before and immediately after the relative increase in cross-sectional area of the hot inlet.

\* \* \* \* \*